US005511158A

United States Patent [19]
Sims

[11] Patent Number: 5,511,158
[45] Date of Patent: Apr. 23, 1996

[54] SYSTEM AND METHOD FOR CREATING AND EVOLVING DIRECTED GRAPHS

[75] Inventor: Karl P. Sims, Somerville, Mass.

[73] Assignee: Thinking Machines Corporation, Bedford, Mass.

[21] Appl. No.: 286,149

[22] Filed: Aug. 4, 1994

[51] Int. Cl.⁶ ..................................... G06T 17/00
[52] U.S. Cl. ................... 395/140; 395/119; 395/120; 395/133; 395/20; 395/24; 395/152
[58] Field of Search ...................... 395/119, 120, 395/133–139, 140, 141, 152, 13, 20–24, 75–77; 382/155–159

[56] References Cited

U.S. PATENT DOCUMENTS 5,136,686  8/1992  Koza ........................................ 395/13

Primary Examiner—Almis R. Jankus
Attorney, Agent, or Firm—Richard A. Jordan

[57] ABSTRACT

A system processes directed graphs, each directed graph comprising a plurality of nodes interconnected by arrows defining a relationship among the nodes, each node defining a selected attribute. The system comprises an initial population means, a subsequent generation population generating means, and a competition simulation means. The initial population means provides an initial population of directed graphs that comprises an initial current generation during an initial iteration. The subsequent generation population generating means generates, in response to selected ones of the directed graphs in each of a plurality of current generations, modified directed graphs for use generation during a subsequent iteration. The competition simulation means performs a processing operation in connection with attributes of the nodes of the graphs to simulate a competition among the current generation of directed graphs in connection with a selected goal, to develop the ranking information for use by the subsequent generation population generating means. The operations of the initial population means, the subsequent generation population generating means and the competition simulation means are controlled through a series of iterations. In the successive iterations, the performance of the graphs in response to the selected goal is anticipated to improve, since the population of graphs for each iteration is based on the graphs determined to have the best fitness during the previous iteration.

16 Claims, 5 Drawing Sheets

150. ONE PROCESSING NODE 13(0) GENERATES A PLURALITY OF INITIAL GRAPHS EACH ASSOCIATED WITH AN INITIAL VIRTUAL CREATURE

151. PROCESSING NODE 13(0) TRANSMITS GRAPHS REPRESENTING VIRTUAL CREATURES TO OTHER PROCESSING NODES 13(I) OVER INTERCONNECTION NETWORK

152. PROCESSING NODES 13(I) PERFORM OPERATIONS IN CONNECTION WITH RESPECTIVE VIRTUAL CREATURES TO SIMULATE COMPETITION AND GENERATE FITNESS SCORES IN RESPONSE THERETO

153. PROCESSING NODES 13(I) TRANSMIT FITNESS SCORES FOR RESPECTIVE VIRTUAL CREATURES TO PROCESSING NODE 13(0)

154. PROCESSING NODE 13(0) DETERMINES WHETHER IT IS TO PERFORM OPERATIONS IN CONNECTION WITH A SUBSEQUENT GENERATION OF VIRTUAL CREATURES

YES

NO

EXIT

155. PROCESSING NODE 13(0) USES FITNESS SCORES TO GENERATE RANKING FOR GRAPHS REPRESENTING VIRTUAL CREATURES AND PERFORMS MUTATION/MATING OPERATIONS IN CONNECTION THEREWITH TO GENERATES A POPULATION OF VIRTUAL CREATURES FOR A SUBSEQUENT GENERATION.

FIG. 7

SYSTEM AND METHOD FOR CREATING AND EVOLVING DIRECTED GRAPHS

INCORPORATION BY REFERENCE

Karl Sims, "Evolving Virtual Creatures", a paper attached hereto as an appendix, incorporated by reference.

Karl Sims, "Evolving 3D Morphology and Behavior By Competition", a paper attached hereto as an appendix, incorporated by reference.

FIELD OF THE INVENTION

The invention relates generally to the field of digital computers, and more particularly relates to methods and systems for generating and evolving structures defined by directed graphs. In one embodiment, the directed graphs define virtual "creatures" having morphologies ("structure") and internal controls ("neurons") that are defined by the directed graphs. In that embodiment, the invention facilitates testing the directed graphs so generated by means of performing a simulated competition among the virtual creatures defined thereby and selection of those ranking highly in the competition for mutation and mating to develop a subsequent generation, through a series of iterations.

BACKGROUND OF THE INVENTION

Developing objects and verifying them to be optimum has proven to be a difficult and arduous task for a number of classes of problems. Genetic algorithm methodologies have been developed to facilitate development of optimal solutions. In genetic algorithm methodologies, objects are represented by "genomes," which, in a series of iterations, are evaluated, selected in accordance with predetermined selection or fitness criteria, and mated and mutated in a selected manner. The result at the end of each iteration represents a set of objects which, in turn, are evaluated during a subsequent iteration. In each iteration, characteristics of those genomes that are selected in the selection step survive to the next iteration, in a manner similar to survival of genetic traits from one generation to the next under Darwin's theory of natural selection. Genetic algorithm methodologies thus facilitate construction of what might be described as "spaces" of objects which are searched for optimal solutions.

SUMMARY OF THE INVENTION

The invention provides a new and improved system and method for creating and evolving directed graphs.

In brief summary, the invention provides a new system for processing directed graphs, each directed graph comprising a plurality of nodes interconnected by arrows defining a relationship among the nodes, each node defining a selected attribute. The system comprises an initial population means, a subsequent generation population generating means, and a competition simulation means. The initial population means provides an initial population of directed graphs that comprises an initial current generation during an initial iteration. The subsequent generation population generating means generates, in response to selected ones of the directed graphs in each of a plurality of current generations, modified directed graphs for use generation during a subsequent iteration. The competition simulation means performs a processing operation in connection with attributes of the nodes of the graphs to simulate a competition among the current generation of directed graphs in connection with a selected goal, to develop the ranking information for use by the subsequent generation population generating means. The operations of the initial population means, the subsequent generation population generating means and the competition simulation means are controlled through a series of iterations. In the successive iterations, the performance of the graphs in response to the selected goal is anticipated to improve, since the population of graphs for each iteration is based on the graphs determined to have the best fitness during the previous iteration.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 7 is a flow chart depicting the operations performed by the computer object processing system.

DETAILED DESCRIPTION OF AN ILLUSTRATIVE EMBODIMENT

Figure 1:
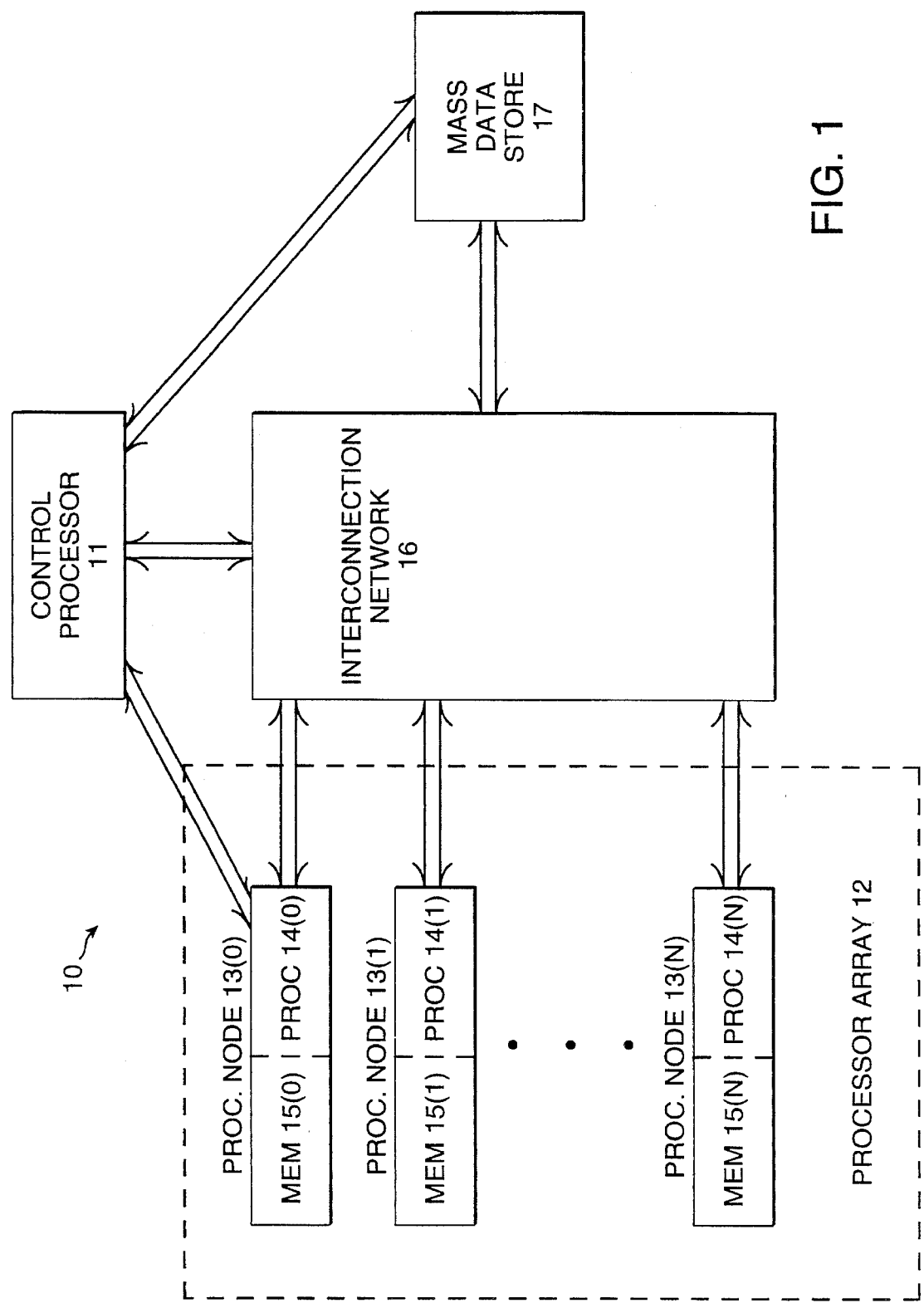
FIG. 1 is a general block diagram of a massively-parallel computer system useful in one embodiment of a computer object processing system constructed in accordance with the invention.

The invention provides a new computer object processing system for generating and evolving objects represented in the form of directed graphs. Briefly, in one embodiment described herein, the directed graphs visually represent virtual "creatures" having morphologies and control systems that are developed and evolved using techniques of artificial evolution. The morphologies define the creatures' physical structures, and the control systems define how they react to and move through their environment. A creature is composed of virtual segments each of which is represented by a node in the graph. Connections each from one segment to another, represented by pointers in the directed graph, define how the segments are connected to form the creature. Each segment is defined by a number of characteristics which will be described below in detail, including physical size and also a joint which defines how the segment connects to a segment defined by a node upstream of the segment's node in the directed graph. In one embodiment, joints may be of a number of different types, each of which has selected bend and rotation characteristics, which define how the segment can move relative to its parent.

Each creature's control system controls the movement of the creature's various segments. The control system is generally distributed among the segments, except for a centralized portion which provides coordinating information to all of the segments. In one embodiment, the control system can include sensors, neurons and effectors, with sensors providing sensory information concerning selected aspects of the creature's position and its environment, effectors exerting forces on the joints thereby effecting movement of the segments, and neurons stimulating the effectors in response to sensory information from the sensors and the coordinating information from the centralized portion.

As noted above, the creatures are generated and evolved using artificial evolution techniques. In that operation, a number of mutation and mating techniques are applied to the directed graphs defining the creatures, whereby the sizes of the respective segments, types of joints and their locations may be modified. The mutation and mating techniques are also applied to interconnections among the various elements of the control system and parameters associated therewith controlling, for example, elements and outputs of the centralized portion, sensitivity of the sensors to external stimuli, weighting factors used by the neurons in weighting inputs that they receive from various sensors connected thereto, and functions performed by the neurons in generating their respective outputs in response to the weighted inputs. In addition, the mutation and mating techniques are applied to connections among the sensors, neurons and effectors and the numbers and types thereof.

Pursuant to the artificial evolution techniques, the creatures compete according to selected fitness determination criteria to determine their respective fitnesses, and a subsequent generation is generated by application of the mutation and mating techniques to selected numbers of the creatures of selected fitness levels. In one embodiment, each creature is individually tested in accordance with the fitness determination criteria to determine the creature's fitness. As an example, the fitness determination criteria may relate to the ability of a creature to move by walking over a surface or swimming through a fluid, in which case the fitness level may relate to the time required to move from a starting point to a destination. As a further example, the fitness determination criteria may relate to the ability of a creature to move towards, for example, a light source, and the fitness level for such a creature may relates to the speed with which the creature moves toward the light source. In another embodiment, the creatures compete against each other in accordance with a particular activity as the fitness determination criteria and the fitness level may relate to the win/loss result for each creature.

In one embodiment, the computer object processing system comprises a suitably-programmed massively-parallel computer which generates object data representing each of the creatures. FIG. 1 is a general block diagram depicting a massively-parallel computer system 10 useful in one embodiment of the computer object processing system. With reference to FIG. 1, the massively-parallel computer in one embodiment includes a control processor 11 which transmits commands to a processor array 12. The processor array 12 includes a plurality of processing nodes 13A through 13N [generally identified by reference numeral 13(i)], each including a processor 14(i) and a memory 15(i).

The massively-parallel computer depicted in FIG. 1 operates generally in a "MIMD," or "multiple-program/multiple-data," manner. In MIMD, the control processor 11 may transmit commands to be generally control the processing nodes 13(i). The processors 14(i) receive the commands and, in response execute programs to process items of data in their respective memories 15(i). (It will be appreciated that the control processor 11 may comprise a separate element, or it may comprise ond of the processing nodes 13(i) in the processor array 12.) The processor array 12 also connects to interconnection network 16 which enables the processing nodes 13(i) to transfer data, in the form of message packets, thereamong. Each processing node 13(i) is identified by an identifier, which also serves as an address in the interconnection network. When one processing node 13(I) needs to send data to another processing node 13(J), it does so in a message which identifies the recipient processing node 13(J).

One embodiment of the massively-parallel computer also includes a mass data store 17 which stores data to be processed by the processing nodes 13(i) of the processor array 12 and data that has been processed thereby. In that embodiment, the processor array 12 and mass data store 17 transfer data therebetween through the interconnection network 16. It will be appreciated that a system in accordance with the invention may be implemented in a massively parallel computer which does not include a mass data store.

Figure 2:
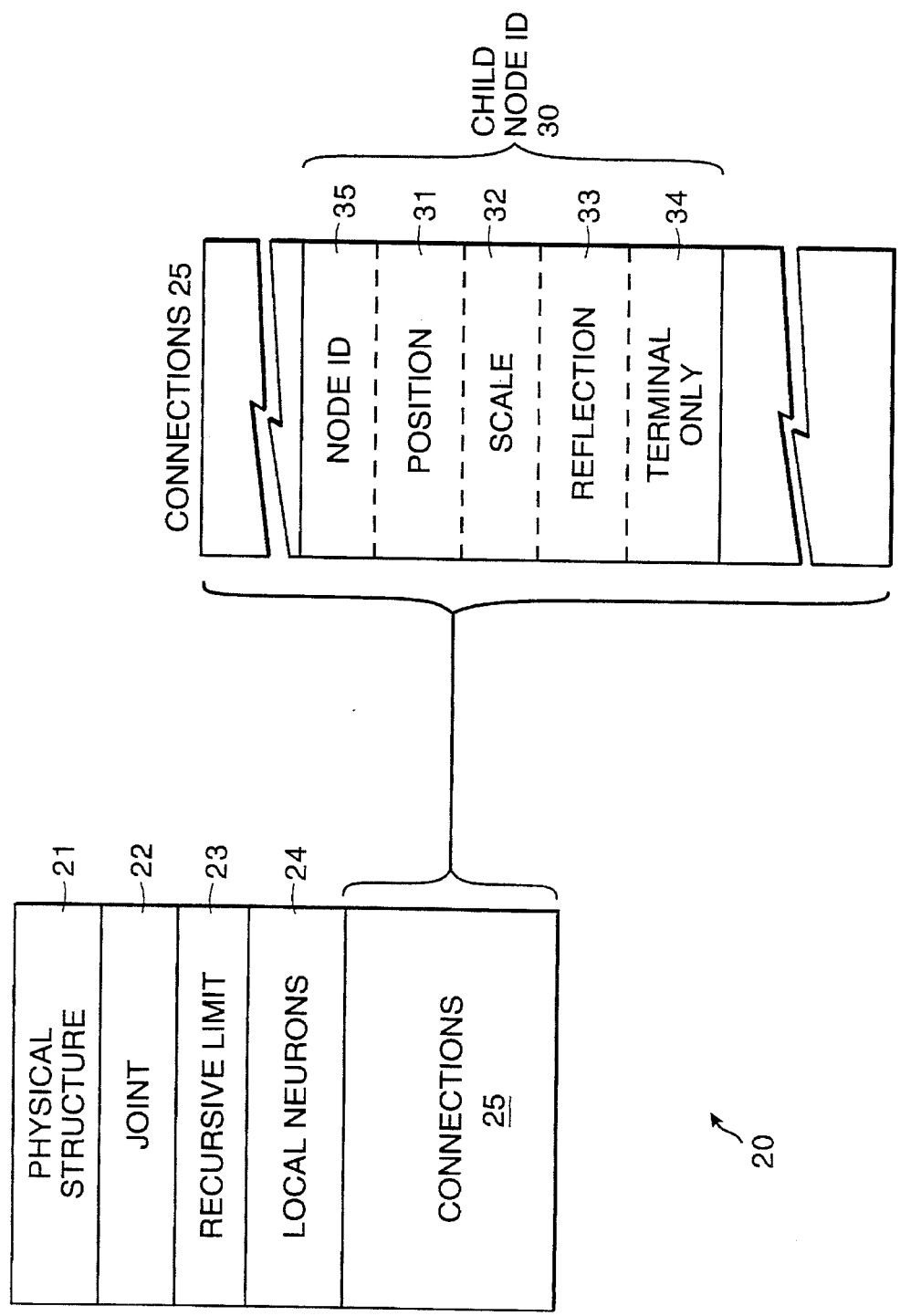
FIGS. 2 through 6 are diagrams useful in understanding the operation of the computer object processing system.

As noted above, the new computer object processing system generates and evolves objects represented in the form of directed graphs representing, in one embodiment, virtual creatures. As is conventional, a directed graph takes the form of a plurality of nodes, each representing a component of the creature represented by the graph, interconnected by arrows which represent the connections among the creature's components. The structure of a node used in that embodiment is shown in FIG. 2. With reference to FIG. 2, each node 20 in the graph includes a plurality of fields including a physical structure field 21, a joint field 22, a recursive limit field 23, a local neurons field 24 and a connections array 25. The physical structure field 21 defines the structure, including the dimensions, of the component defined by the node 20. The connections array 25, which will be described in detail below, includes a number of entries each defining a connection to a child node. The entries in the connections array 25 identify the particular nodes to which a particular node 20 is connected, but it does not define the type of joints with which the node is connected, in particular the type of joint with which the node 20 is connected to the parent node. The joint field 22 contains information that defines the type of joint that connects the component represented by the node 20 to the component represented by the parent node in the directed graph. In one embodiment, types of joints may include such joints as rigid, revolute, twist, universal, bend-twist, twist-bend and spherical. The joint field also contains joint movement limitation information such as the point beyond which restoring spring forces will be exerted for that degree of freedom, spring constants for the spring forces and absolute joint movement limitations, each directed to a particular degree of freedom.

The recursive limit field 23 included in node 20 includes a parameter that defines the number of instances the component represented by the particular node may be instantiated, up to a scale factor, in the virtual creature. The recursion may be represented by a directly-connected instantiations, or there may be components represented by other nodes connected between instantiations; otherwise stated, a recursion to which the recursion limit applies may be a direct cycle in the graph (where the node has a connection in the connection array 25 that points directly to itself), or it may be an indirect cycle (where there are intermediate nodes in the cycle). Duplication of components in this manner allows for efficient duplication of substantially the same component in the creature, up to a scale factor contained in the connections array 25, without requiring complete separate nodes.

The local neurons field 24 identifies the portion of the creature's control system that is local to the particular node, and in particular identifies the types of sensors, neurons and effectors (generally, "neurons") that are local to the node. The local neurons field 24 also identifies the connections among the neurons in the node and connections of the neurons to neurons of other nodes. The local neurons field also includes parameters that define the operations of each neuron, including input and output weights which define particular weights to be used in connection with processing of the inputs and outputs of the neurons. The parameters may also include information used to define differences among weights to be used for various instantiations of the nodes in a recursive cycle.

As described above, the connections array 25 includes one or more of entries each defining a connection of one component represented by the node 20 to another component. One entry in the connections array 25, identified by reference numeral 30, is shown in detail in FIG. 2. As shown in FIG. 2, an entry 30 includes five fields, including a node identifier field 35, position field 31, a scale field 32, a reflection flag 33 and a "terminal only" flag 34. The node identifier field 35 identifies the node in the graph to which this node is connected. The position field 31 identifies the position of the component represented by the node relative to the component represented by the other node, including, for example, the particular surface of the parent node to which the node 20 is attached. The scale field 32 contains a scaling factor indicating the scale of the instantiation relative to the size set forth in the structure field 21. A reflection field 33, indicates whether the component is actually positioned on another surface of the parent, as identified by the contents of the position field. The field 33 identifies the particular axis or axes of the component identified by the parent node in the graph, around which the component represented by the node is reflected. If there is a reflection, the its joint structure is the reflected image of that set forth in the joint field 22 and movements of the component as enabled by any effectors are appropriate reflections, about the same axis or axes, of the movements enabled by effectors included in the local neurons field. The reflection flag 33 enables components to be symmetrically disposed around a parent node, but to operate independently of each other. The terminal only flag 34, when set, indicates that the entry 30 is associated only with a component for which the recursive limit value in field 23 has been reached.

The connections identified in the connections array 25 identify connections among components of the virtual creatures that are defined by the nodes. Connections among neurons are defined by the contents of the local neurons field 24. Accordingly, neurons defined by the local neurons field of a particular node may be connected to neurons in nodes defining other components to which the particular node is not connected. The neurons defined by the local neurons fields 24 of the nodes 20 in the directed graph effectively form a directed "neural" graph which is nested in the structural, or "morphological" graph defined by the other fields of the nodes 20.

Figure 3:
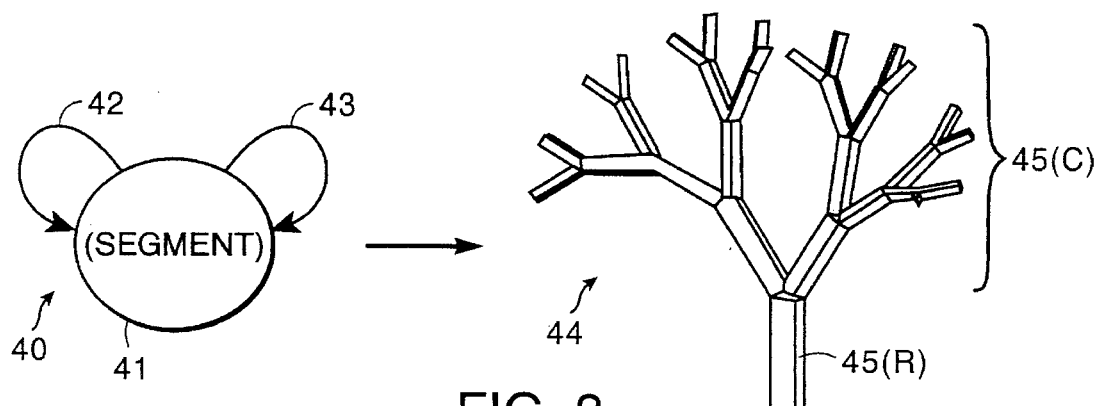
Figure 4:
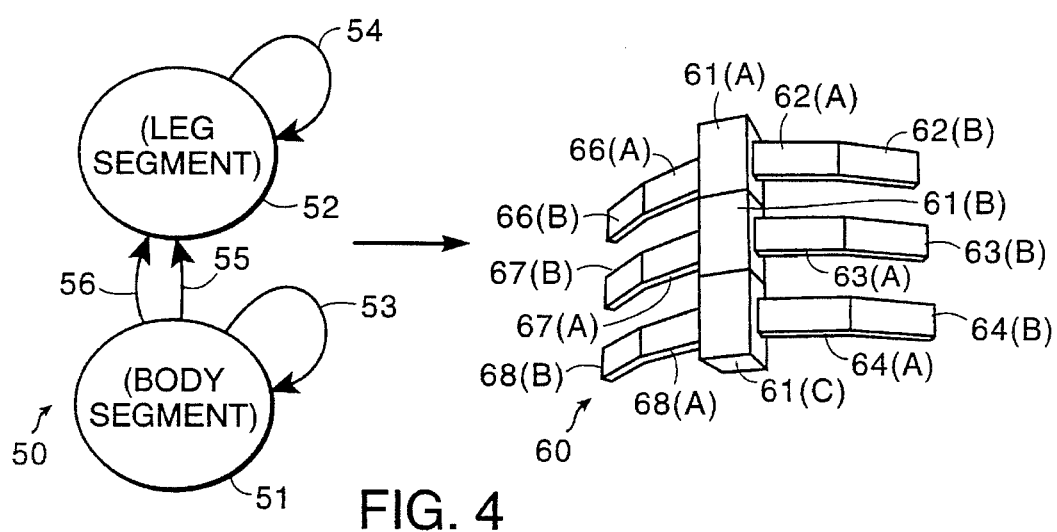
Figure 5:
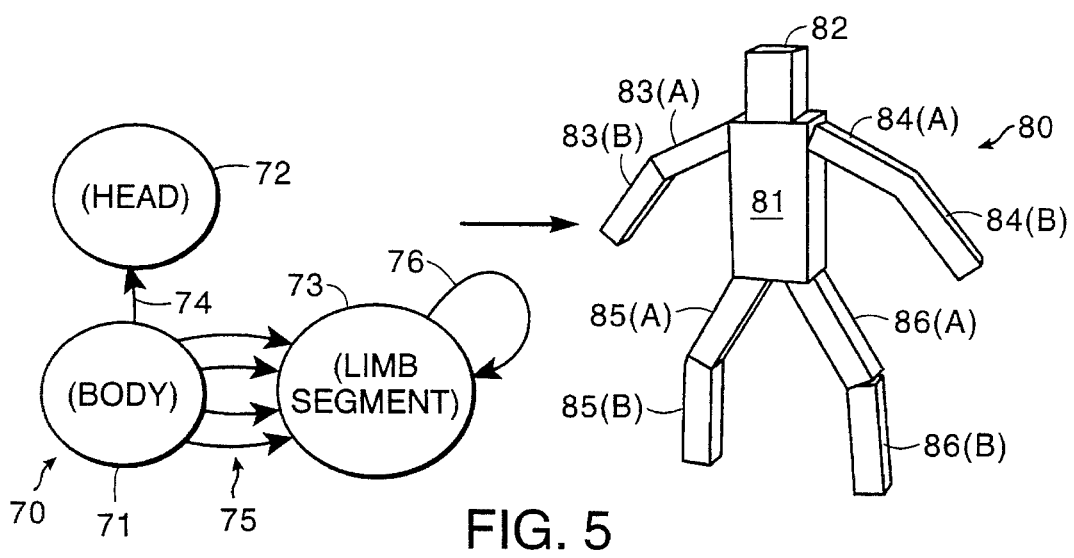

Illustrations of several directed graphs, and the virtual creatures represented thereby, are depicted in FIGS. 3 through 5. With reference to FIG. 3, that Fig. depicts a directed graph 40 comprising a single node, represented by element 41, shown having two recursive connections to itself, indicated by arrows 42 and 43. It will be appreciated that the particular joint structure and the number of recursions will be specified by the particular values established in the various fields of the specific node 20 represented by element 41. The virtual creature represented by directed graph 40, which is identified by reference numeral 44, includes a root segment 45(R) forming the root of a binary tree, with child segments, generally identified by reference numeral 45(C), in successive layers of the tree. As will be appreciated from FIG. 3, there are two child segments connected to root segment 45(R), the number corresponding to the two arrows 42 and 43.

FIG. 4 depicts a directed graph 50 comprising two nodes represented by elements 51 and 52. Elements 51 and 52 each have a recursive connection to itself, respectively indicated by arrows 53 and 54, and there are two connections in the directed graph between element 51 and element 52 as indicated by the two arrows 55 and 56. The virtual creature represented by directed graph 50 is identified by reference numeral 60. Virtual creature 60 includes three segments 61(A), 61(B) and 61(C) (generally identified by reference numeral 61(*i*), each represented by the element 51, and segments 62(A) through 68(B), each represented by the element 52. (As suggested by the legends in elements 51 and 52, the segments 61(*i*) may be anthropomorphically analogized to body components and segments 62(A) through 68(B) may be anthropomorphically analogized to leg components.) As is apparent from FIG. 4, leg segments 62(A) and 66(A) are connected directly to body segment 61(A), which connections are represented by the arrows 55 and 56 in the directed graph 50. Leg segments 62(B) and 66(B) are connected directly to leg segments 62(A) and 66(A), which connections are represented by the recursive arrow 54. Similarly, body component 61(B) is connected directly to body component 61(A), and body component 61(C) is connected to body component 61(B), all of which connections are represented by the single recursive arrow 53; as indicated above, the fact that a node is subject to recursion in the directed graph is indicated by the recursive arrow, in this case arrow 53, but the number of recursions is indicated by particular values in the respective fields of the node 20. That two leg segments are connected to each body segment is represented by the two arrows 55 and 56 interconnecting the elements 51 and 52 in the directed graph.

FIG. 5 depicts a somewhat more complex directed graph 70 including three nodes including a body element 71, a head element 72 and a limb element 73. The body element 71, representing a root node in the directed graph 70, is connected to the head element 72 over a connection represented by arrow 74. Body element 71 is also connected to the limb element 73 over four connections represented by arrows generally identified by reference numeral 75. As shown in FIG. 5, limb element has a recursive connection represented by arrow 76. The virtual creature represented by directed graph 70 is identified by reference numeral 80. Virtual creature 80 includes a single segment 81 corresponding to element 71 of the directed graph 70, a segment 82 corresponding to element 72 of the directed graph 70, and eight segments 84A through 86(B) corresponding to element 73 of the directed graph. (As suggested by the legends in the elements 71 through 73, the segment 81 may be anthropomorphically analogized to a body component, segment 82 may be anthropomorphically analogized to a head component, and segments 83A through 86(B) may be anthropomorphically analogized to limb components, including arm and leg components.) As is apparent from FIG. 5, head segment 82 is directly connected to body segment 81, which connection is represented by the arrow 74 in the directed graph 50. The limb segments 83(A), 84(A), 85(A) and 86(A) are all directly connected to the body segment 81, as represented by the four arrows 75 interconnecting elements 71 and 73 in the directed graph 70. In addition, the limb segments 83(A), 84(A), 85(A) and 86(A) are directly connected to respective limb segments 83(B), 84(B), 85(B) and 86(B), as represented by the recursive arrow 76 in the directed graph; as indicated above, the fact that a node is subject to recursion in the directed graph is indicated by the recursive arrow, in this case arrow 76, but the number of recursions is indicated by particular values in the respective fields of the node 20.

Figure 6:
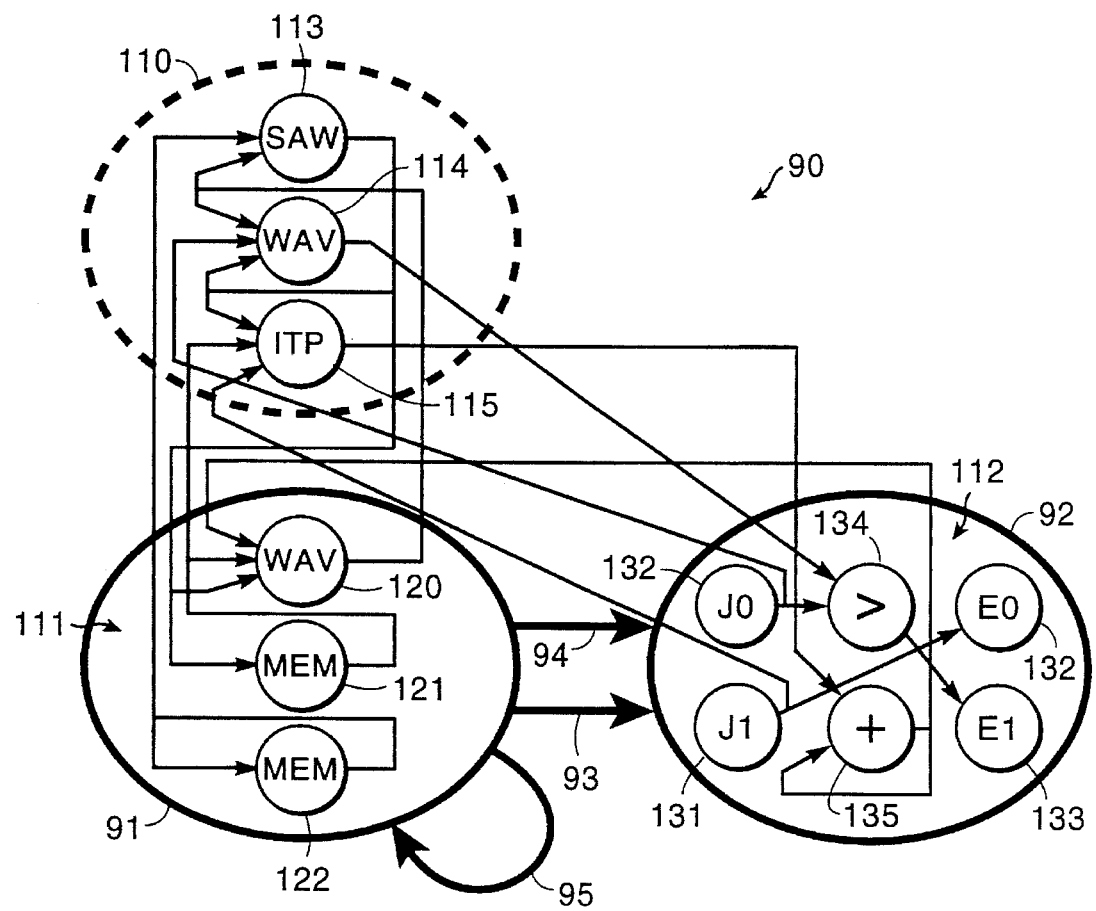
Figure 6:
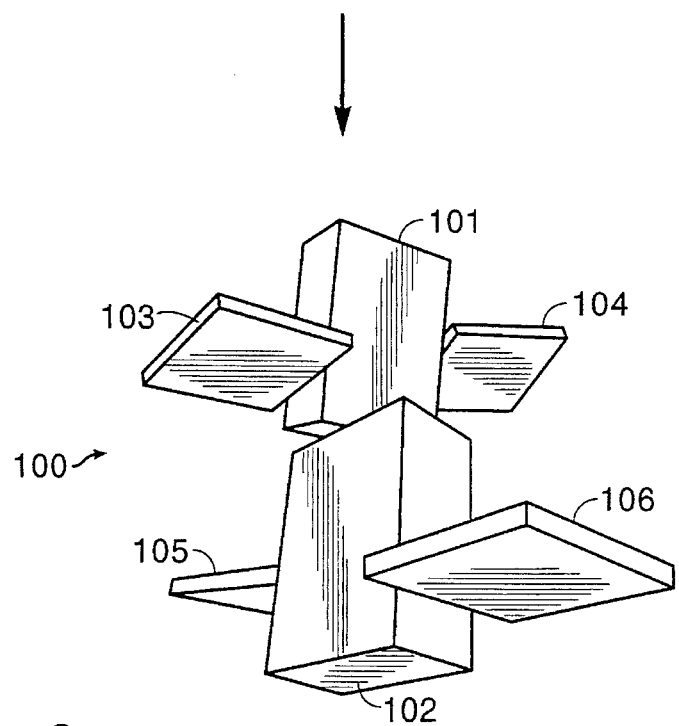

As described above, each virtual creature also includes a control system, which includes a portion that is distributed among the various nodes comprising the graph defining the creature, as well as a centralized portion that is not associated with any specific node. FIG. 6 depicts a graph 90 comprising two nodes 91 and 92 interconnected by arrows 93 and 94. Node 91 further has a recursive connection represented by an arrow 95. The virtual creature represented by the graph 90 is identified by reference numeral 100. Creature 100 includes two body components 101 and 102, both represented by the node 91, with the separate body components 101 and 102 being indicated by the recursive arrow 95. Connected to the body component 101 are a pair of limb components 103 and 104, both represented in the directed graph by node 92, with the separate limb components being indicated by the two arrows 93 and 94 in the directed graph. In addition, connected to the body components 102 are a pair of limb components 105 and 106, which are also both represented in the directed graph 90 by the arrows 93 and 94.

FIG. 6 also depicts an illustrative control portion, including a centralized portion 110, a set of neurons 111 associated with node 91 and a set of neurons 112 associated with node 92. The centralized portion 110 includes neurons 113, 114, and 115, representing, respectively, a sawtooth generator, a waveform generator and an interpolator. The sawtooth generator generates an output which has a conventional sawtooth pattern, with an amplitude, phase and period defined by its inputs and a set of parameters which are subject to mutation. The waveform generator generates an output which has a conventional sinusoidal pattern, also with an amplitude, phase and period defined by its inputs and a set of parameters which are subject to mutation. The interpolator generates an output which is a selected interpolation function of its inputs, with the function being subject to mutation.

In the particular virtual creature represented by the graph 90 depicted in FIG. 6, it can be observed in that Fig. that the interpolator's output is not connected to any other element. In that graph 90, the interpolator is present and receives inputs and generates outputs, but the outputs do not affect operation of the virtual creature 100 represented by the graph. It will be appreciated from the discussion below that, for a graph defining a virtual creature, it is possible for a graph to be created during mutation and mating procedures in which not all elements are completely connected. As will be described below, if an element is connected to at least one other element in the graph, it will remain in the graph after the mutation and mating operation; on the other hand, if, at the end of the mutation and mating operation an element is not connected to at least one other element in the graph, it will be removed in a "garbage collection" operation.

The neurons 111 associated with node 91 includes neurons 120, 121 and 122, representing, respectively, a waveform generator, a memory or delay element, and an absolute value generator. As with the waveform generator represented by neuron 114, the waveform generator represented by neuron 120 generates an output which has a conventional sinusoidal pattern, also with an amplitude, phase and period defined by its inputs and a set of parameters which are subject to mutation. The parameters defining the amplitude, phase and period for the waveform generator represented by neuron 120 may differ from those for the waveform generator represented by neuron 114, and may be separately mutated. The delay element represented by neuron 121 periodically latches and holds the value of its input, and provides an output representing the latched value. The operating characteristics of the delay element, in particular the delay period, are defined by parameters which are subject to mutation. The absolute value element represented by neuron 122 generates an output that is the absolute value of the input, that is, for positive values of the input the output corresponds to the input, whereas for negative values of the input the output corresponds to the negative of the input. Various operating characteristics of the absolute value element may be defined by parameters which are subject to mutation, including scaling or amplification of the absolute value, complementing, and the like.

The neurons 112 associated with the node 92 include two sensors 130 and 131, two effectors 132 and 133, and two additional neurons 134 and 135. The sensors 130 and 131 comprise joint angle sensors which generate outputs whose values reflect the angle of the joint interconnecting the limb component and body component represented by nodes 92 and 91; the outputs of the sensors will have amplitudes which are selected functions of the respective angles, the functions being defined by parameters, with both the functions and the parameters being subject to mutation.

The neurons 134 and 135 associated with node 92 comprise, respectively, a "greater than" element and an adder element. The "greater than" element represented by neuron 134 receives two inputs, in this case from sensor 130 and generates a low output if one input is greater than or equal to the second input, and a high output if the second input is greater than the one input. The adder element represented by node 135 receives two inputs and generates an output reflecting the sum of the inputs.

The effectors associated with node 92 enable motion by the component including the effectors to move relative to the joint connecting the component to the parent. Each joint is defined by zero or more degrees of freedom, and each effector applies a virtual force with respect to a degree of freedom, with the force being a function of the inputs received from other neurons and values of various parameters, all of which can be modified during mutation and mating. For the virtual creature depicted in FIG. 6, the input of effector 132 is connected directly to the output of sensor 131, and so the force applied by effector 132 to the joint along the degree of freedom controlled thereby is a direct function of the output of the sensor 131. The effector 133 is connected to the output of the "greater than" neuron 134 and will generate a force that is a selected function thereof. As with effector 132, the force generated by effector 133 is applied along the degree of freedom of the joint assigned to the effector 133.

As described above the new computer object processing system mutates and mates virtual creatures of one "generation" to create a next generation by applying a plurality of mutation and mating techniques to the nodes of the graphs comprising the symbolic representation of the virtual creatures. For each mutated creature to be produced, the computer object processing system generates a copy of the graph, and, beginning with the root node and progressing down the tree, may apply one of the mutation techniques to each node in the graph. In one particular embodiment, the computer object processing system employs a variety of mutation techniques, including:

1. The system alters the internal parameters of the node, as defined in the fields described above in connection with FIG. 2. The system mutates each type of parameter with a mutation frequency that determines the probability that a mutation will be applied to the parameter for each type of node. Parameters which take the form of Boolean values are mutated by flipping their state. The system mutates parameters which take the form of scalar values by adding random numbers to them for a Gaussian-like distribution, so that small adjustments, percentage-wise, are more likely than large ones. The adjustment value is selected so that the scale of an adjustment is relative to the value for the previous generation, so that large values can be varied over a wider range than small values. A mutation may also change the sign of a parameter. After the system mutates a scalar value, it clamps it to a predetermined bound. For parameters that have a predetermined set of permitted values, the system does not mutate by modifying the values in the set, but instead selects one of the values at random from the set.

2. The computer object processing system may generate a node at random and add it to the graph or substitute it for an existing node in the graph. With this mutation technique, the graph is modified so that, in the tree structure, for the node at which substitution is to occur, the sub-tree of which the node is a relative root is replaced by a new sub-tree for the randomly-generated node. This technique allows the complexity of the graph to increase as evolution proceeds through successive generations.

3. The system may mutate parameters of each connection, in the same way the parameters of the nodes are mutated as described above. The system may modify the connection pointer to point to a different node which is selected at random; it will be appreciated that such a mutation will cause the limb, and all more extreme limbs connected thereto, to be moved to a component represented by the new connection. In addition, mutation of the connections permits nodes which may have been added at random in connection with the preceding paragraph, to be connected to other nodes in the graph. If a node is added but not connected during the mutation process, it can be removed as described below.

4. The system adds new connections at random and removes existing connections. For a graph representing a control system, the system does not use this mutation technique because the number of inputs is fixed. However, in a morphological graph (depicted in, for example, FIGS. 3 through 5) which defines the structure of a virtual creature, a variable number of connections can exist per node, representing additional limbs as indicated by, for example, arrows 55 and 56 in FIG. 4 and arrows 75 in FIG. 5. Using this mutation technique, the system can add a new connection (represented by an arrow in the Figs.), or remove an existing connection.

5. In one embodiment, the system also removes nodes that have not been connected or whose connections were removed during the mutation process.

6. In addition, the system can "mate" two directed graphs to produce a single child graph. In one embodiment the system uses two mating techniques. In one "crossover" technique, nodes of the two graphs are arrayed linearly and a selected string of nodes from the graph representing one parent are substituted for a correspondingly-placed string of nodes from the graph representing the other parent, with the result being the child. In a second "grafting" technique, a sub-tree of the graph representing one parent (which may, but need not, comprise the entire parent) is substituted for a sub-tree in the graph representing the other parent, with the result being the child.

In generating a mutated expression defining a mutated object, the system applies these mutation techniques to the nodes at varying frequencies and with varying probabilities. Generally, in one particular embodiment, the probability that any particular node will be mutated is relatively low, so that differences between each mutated object and the object from which they are being mutated will likely not be huge from one iteration to the next. If a node is to be mutated, the frequencies with which each particular mutation technique is applied may vary with respect to the type of node to which a mutation technique is to be applied, as well as with respect to the particular mutation technique to be applied.

As noted above, the system generates the graphs representing the population of virtual creatures for one generation, causes them to engage in a selected competition to provide a ranking, and mutates a selected proportion of the virtual creature population to a subsequent generation. The virtual creatures whose graphs are selected to mutate are, in accordance with the genetic algorithm methodology generally utilized by the system, preferably those having the higher rankings in the competition. The system repeats these operations through a series of iterations, in each iteration providing a new generation to engage in the ranking competition. Through a series of iterations, by selecting virtual creatures having higher rankings in the virtual creature population, it is expected that the creatures' performance in the competition will improve.

The system can make use of two general methodologies in connection with the competition. In one general methodology, the creatures compete by attempting to perform a selected operation, such as walking on a surface over a selected path such as a straight line or a circle, swim through a fluid over a selected path, walk or swim towards a light source or the like. In such a competition, the creatures compete individually, and the rankings may be based, for example, on the time required for them to individually traverse the path, or on the distance from a point selected as a goal at the end of a selected time period, on angle of deviation from the predetermined path, or the like.

In a second general methodology, a virtual creature competes against another creature in the population to perform a selected operation. For example, two virtual creatures, positioned on opposite sides of a block, compete against each other to gain control of the block. In such a competition, it may be sufficient for a virtual creatures merely need to provide that the other cannot move the block, or alternatively the competition may be such as to require movement of the block past oppositely-disposed goal lines. In such a methodology, the ranking may be based merely on which virtual creature in a pair of competing virtual creatures wins or loses a particular competition, or it may also be based on the time required with a relatively lengthy time indicating that the competing creatures may be relatively similar in fitness, while a relatively short time indicating that the winner may be substantially more fit than the loser. In this methodology, it will be appreciated that various arrangements may be used to select of pairs of virtual creatures from the population to engage in a competition, including (i) random pairing, (ii) each virtual creature competing against all of the others, (iii) each virtual creature in a generation competing against a virtual creature having a "best" ranking from the previous generation, or the like. It will be appreciated that the pairing methodology will preferably be selected to increase the likelihood of achieving a representative ranking for selection of virtual creatures to be mutated for the next generation; but the amount of processing required to maximize the likelihood, which corresponds to pairing methodology (ii) above, can be rather substantial and other pairing methodologies may be selected which are a compromise based on amount of processing required to perform the competition.

For the illustrative competitions performed by the system as described above, the competitions are based on simulated movement of the virtual creatures on a surface, through a fluid, or generally through an environment. For each virtual creature, the movements of the virtual creature through its environment are based on simulated forces applied by the virtual creature's various components to its environment. As noted above, each joint's effectors generate forces associated with the joint's various degrees of freedom. Based on the forces applied by a joint's effectors, which may vary with time and in response to inputs from the various neurons, including sensors, that may be connected thereto, and further based on various characteristics of the joint, including the type of joint, and movement limitations and restoring forces applied by the joint itself in opposition to the forces applied by the effectors, the forces applied by the effectors may simulate movement of the component in a particular direction in virtual space. Conventional laws of Newtonian physics can be readily used in a straight-forward manner to generate simulations of movement of the virtual creatures.

Simulation of motion generally proceeds over a series of time intervals, with the change in position of the various components of a virtual creature being determined for each time interval. It will be appreciated that the system will generally use four steps to determine change in position for each time interval. In a first step, the system resolves forces applied to the components; in this step, the system uses procedures outlined in R. Featherstone, *Robot Dynamics Algorithms* (Kluwer Academic Publishers, Norwell, Mass., 1987), in particular an articulated body methodology, to determine accelerations from the velocities and external forces of each subtree of nodes representing a hierarchy of components. The system determines the resulting motions from the accelerations by integration of the accelerations using the conventional Runge-Kutta-Fehlberg method, which is a conventional fourth-order Runge-Kutta integration method with an additional evaluation to estimate the integration error and adapt the step interval.

At the end of each time interval, after determining movements over the time interval, the system then uses a collision detection step to detect collisions between components of a virtual creature and the environment, such as a surface on which it is walking or the surface of a block for which it is competing, or collisions between two components of the same or different virtual creatures. The system determines that a collision has occurred if, at the end of a time interval, the boundaries of two components are, or a component and a surface of the environment, are positioned in such a manner that they have intersected each other. If the system detects a collision in of greater than a selected tolerance amount, it resets to the beginning of the time interval and repeats these operations using a reduced time interval. When the system detects a collision of less than the selected tolerance amount, it performs a collision response step in which it simulates the colliding components rebounding off each other. In one embodiment, if a collision occurs between two components or a component and a surface moving at high relative velocities, the system determines impulse forces on the colliding elements resulting from the collision and determines responsive movements of the elements in succeeding time intervals. On the other hand, if the colliding elements are moving at relatively low relative velocities, the system uses a restoring spring model to determine the forces on the elements due to the collision. In the latter case, the system determines the values of the forces between the colliding elements based on the amount of penetration, up to the tolerance level, and selected parameters relating to modulus of elasticity and coefficients of friction for the various colliding elements. For each virtual creature and for each time interval, the system uses these collision forces along with the forces generated by the effectors on virtual creature's components, in determining the movements of the virtual creature for the next time interval, and in such manner simulates movements of the virtual creatures through their environments in the respective competitions.

With this background, the operations of the system will be described in connection with the flow chart depicted in FIG. 7. With reference to FIG. 7, one of the processing nodes, identified herein as processing node 13(0), under control of the control processor 11, generates a plurality of directed graphs representing a population of virtual creatures (step 150). In this operation, the processing node 13(0) may generate the directed graphs at random, or the graphs may be an initial set of predetermined "seed" graphs that are provided to the system from another source, or they may be generated by the processing node 13(0) in response to selected criteria. After establishing the initial population, the processing node 13(0) transmits the graphs to the other processing nodes 13($i$) over the interconnection network 16 (step 151). The other processing nodes 13($i$) will perform the operations described above to simulate the competition among the virtual creatures represented by the graphs, and will generate fitness scores in response (step 152). (It will be appreciated that the processing nodes 13($i$) to which the processing node 13(0) transmits the graphs in step 151 will reflect the nature of the selected competition; that is, if the competition is between pairings of virtual creatures, the processing node 13(0) will transmit the graphs so that the same processing node will receive both graphs in a pairing.)

After the processing nodes 13($i$) have generated the fitness scores for the respective virtual creatures, they will transmit them to the processing node 13(0) (step 153), which will use them in generating a ranking for the virtual creatures in the population. The processing node 13(0) will determine if it is to continue operations for a subsequent generation (step 154) and if so it will use the rankings to select virtual creatures whose graphs will be used in generating graphs for a subsequent generation (step 155). The processing node 13(0) will perform the mutation and mating operations as described above to generate a population of virtual creatures to constitute a subsequent generation, and will return to step 151 to repeat the operations described above in connection with the graphs comprising that generation.

It will be appreciated that, the processing node 13(0) at some point will determine in step 154 that the it is not to continue with a subsequent generation, and at that point will exit. The processing node 13(0) will at that point have ranking information for graphs for all of the generations up to the generation processed in the iteration at which it exits.

The system provides a number of advantages. It will be apparent that the system will assist in developing virtual creatures having particular characteristics which are reflected in the selected competition, without requiring any a priori input of a desired structure. The system generates populations of possible structures and simulates competitions therebetween and, by selecting more successful structures for use in generating subsequent generations, increases the likelihood that characteristics that proved more successful in one generation will be reflected in the next generation, while at the same time providing that the population reflects a relatively wide range of characteristics.

While the invention has been described in terms of virtual creatures, it will be appreciated that the invention will be useful in developing designs of a number of entities, including entities in numerous arts, which comprising components of various configurations having particular functions that may be described in terms of a simulation.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for processing directed graphs, each directed graph comprising a plurality of nodes interconnected by directional links defining a directional relationship among said nodes, each node defining a selected attribute, said system comprising:

A. an initial population means for providing an initial population of directed graphs, said initial population of directed graphs comprising an initial current generation during an initial iteration:

B. a subsequent generation population generating means for generating, from selected ones of said directed graphs in each of a plurality of current genres, modified directed graphs comprising a subsequent generation for use as directed graphs in a current generation during a subsequent iteration, said subsequent generation population generating means (i) selecting ones of the directed graphs in each current generation in response to ranking information, and (ii) processing said selected directed graphs in relation to mutation operations selected from a set of selected types of mutation operations to generate modified directed graphs;

C. competition simulation means for performing a processing operation in connection with attributes of said nodes of said graphs to simulate a competition among said current generation of directed graphs in connection with a selected goal, to develop said ranking information for use by the subsequent generation population generating means; and D. iteration control means for controlling the operations of the initial population means, said subsequent generation population generating means and said competition simulation means through a series of iterations.

2. A system as defined in claim 1 in which, for at least one directed graph during an iteration, at least one of said nodes includes an internal parameter having a value, the subsequent generation population generating means, in performing a selected mutation operation, modifying the value of said internal parameter.

3. A system as defined in claim 2 in which said internal parameter has a Boolean value selected from a predetermined set of values, the subsequent generation population generating means, in performing the parameter mutation operation in connection with the internal parameter, modifying the internal parameter's value by selecting another value from said predetermined set of values.

4. A system as defined in claim 2 in which said internal parameter has a scalar values, the subsequent generation population generating means, in performing the parameter mutation operation in connection with the internal parameter, modifying the internal parameter's value by adding a randomly-selected adjustment value thereto.

5. A system as defined in claim 4 in which the subsequent generation population generating means selects the adjustment value in relation to a Gaussian-like distribution, so that small adjustment values are more likely than large adjustment values.

6. A system as defined in claim 4 in which said internal parameter has a selected value range, the subsequent generation population generating means limiting the internal parameter's value in relation to the range.

7. A system as defined in claim 2 in which the subsequent generation population generating means, in accordance with said mutation operation, generates a node at random and interconnects it with a node of said at least one directed graph.

8. A system as defined in claim 2 in which the subsequent generation population generating means, in accordance with said mutation operation, generates a node at random and substitutes it for a node of said at least one directed graph.

9. A system as defined in claim 1 in which, for at least one directed graph, at least one directional link includes an internal parameter having a value, the subsequent generation population generating means, in performing a selected mutation operation, modifying the value of said internal parameter.

10. A system as defined in claim 9 in which said internal parameter defines the directional relationship between a pair of nodes, the subsequent generation population generating means, in performing the selected mutation operation, modifying the directional relationship between the pair of nodes.

11. A system as defined in claim 1 in which, for at least one directed graph, the subsequent generation population generating means, in performing a selected mutation operation, selecting a pair of nodes and adding a directional link therebetween.

12. A system as defined in claim 1 in which, for at least one directed graph, the subsequent generation population generating means, in performing a selected mutation operation, selecting a pair of nodes having a directional link therebetween and removing the directional link.

13. A system as defined in claim 12 in which the subsequent generation population generating means, after performing the selected mutation operation, removes nodes which are not connected to any other nodes by a directional link.

14. A system as defined in claim 1 in which, for at least two selected directed graphs, the subsequent generation population generating means, in performing a selected mutation operation performs a mating operation in which a selected portion of one of said selected directed graphs are substituted for a selected portion of said other of said selected graphs.

15. A system as defined in claim 1 in which at least some of said directed graphs each represents a portion of a virtual creature having a morphology defined by the directed graph, with each node of said at least some of said directed graphs defining a structural element of one of said virtual creatures.

16. A system as defined in claim 15 in which each virtual creature is further defined by a second directed graph which defines a control structure for controlling virtual movement of the virtual creature's structural elements.

\* \* \* \* \*